(12) United States Patent
Roell

(10) Patent No.: US 6,397,638 B1
(45) Date of Patent: Jun. 4, 2002

(54) METHOD FOR INTEGRATING FASTENERS INTO A KNITTED SEAT COVER AND SEAT COVER WITH FASTENERS

(75) Inventor: Friedrich Roell, Biberach (DE)

(73) Assignees: Stefan Achter, Moenchengladbach; Viktor Nikolaus Achter, Koeln, both of (DE)

(*) Notice: Subject to any disclaimer, the term of this patent is extended or adjusted under 35 U.S.C. 154(b) by 0 days.

(21) Appl. No.: 09/807,195

(22) PCT Filed: Sep. 17, 1999

(86) PCT No.: PCT/DE99/03051

§ 371 (c)(1),
(2), (4) Date: Jun. 29, 2001

(87) PCT Pub. No.: WO00/22213

PCT Pub. Date: Apr. 20, 2000

(30) Foreign Application Priority Data

Oct. 9, 1998 (DE) .......................................... 198 47 331

(51) Int. Cl.[7] .............................................. D04B 1/22
(52) U.S. Cl. ................................ 66/61; 66/170; 66/190
(58) Field of Search ......................... 66/170, 177, 198, 66/60 R, 64, 183, 178 R, 174, 61, 190, 202

(56) References Cited

U.S. PATENT DOCUMENTS

| 5,213,863 | A | * | 5/1993 | Day et al. ...................... 66/170 |
| 5,457,968 | A | | 10/1995 | McClintock |
| 5,802,882 | A | * | 9/1998 | Girard et al. .................. 66/170 |
| 5,890,381 | A | * | 4/1999 | Leeke et al. ................... 66/170 |
| 5,992,185 | A | * | 11/1999 | Leeke et al. ................... 66/170 |
| 6,151,926 | A | * | 11/2000 | Leeke et al. ................... 66/170 |

FOREIGN PATENT DOCUMENTS

| DE | 196 36 208 | 3/1998 |
| EP | 0 361 855 | 4/1990 |
| EP | 0 589 395 | 3/1994 |
| EP | 0 734 670 | 10/1996 |
| WO | 94/26655 | 11/1994 |

* cited by examiner

Primary Examiner—Danny Worrell
(74) Attorney, Agent, or Firm—Smith-Hill and Bedell

(57) ABSTRACT

The invention relates to a method for integrating fasteners into a knitted seat cover for attachment to a seat-cover support by means of a flatbed knitting machine, whereby fastening areas are provided on the side of the seat cover facing the support for attachment to said support while the seat cover is being knitted and said fastening areas interact with additional fastening areas on the support of the seat cover. According to the invention, the fastening areas on the seat cover are embodied as flat velcro structures (hook and loop closures) while the loop areas of the velcro structures are knitted and integrated into the seat cover as flat surfaces during the manufacture thereof. Hook areas of the velcro structure provided on the seat cover are formed by knitting and integrating a hard or hardenable monofilament in the form of loops that protrude towards the support and are subsequently cut or cut during knock-over/after knock-over of the stitches from the needles of the flatbed knitting machine. This enables said fasteners to be integrated in such a way that it is possible to produce the seat cover without any substantial increase in machine running times.

32 Claims, 3 Drawing Sheets a)

b)

METHOD FOR INTEGRATING FASTENERS INTO A KNITTED SEAT COVER AND SEAT COVER WITH FASTENERS

BACKGROUND OF THE INVENTION

The invention relates to a plurality of different processes for integrating fasteners into a knitted seat cover and to a seat cover that has fasteners for fastening to a seat cover support. However, the fasteners are also suitable for fastening other textile elements such as insulation and filter inserts.

In the past, fasteners, such as those in the form of tubes or eyes, had to be sewn onto a preassembled seat cover in a separate sewing operation. Since these seat covers generally were woven and always had to be assembled to create a three-dimensional seat cover (in other words, the individual pieces of the seat cover had to be sewn together), sewing the fasteners onto the underside of the seat cover in an additional step generated a relatively insignificant amount of additional work.

Today, it is possible to knit a three-dimensional seat cover without ever having to do any assembling. This means that a technical solution has to be found in which the fasteners can be integrated into the cover when the cover is being knitted.

EP 361 855 A1 discloses a process in which tubular fasteners are knitted on in a single piece during manufacturing, in other words, when the seat cover is being knitted. The advantage of this approach is that the additional process step of sewing the fasteners on at the desired locations is eliminated. However, this process greatly increases machine operating times, and the tubular fasteners, which are also knitted as a tube when the seat cover itself is being knitted, cannot be produced in any desired length or any desired strength. Another disadvantage of this process is that the locations at which the fasteners are knitted on are generally visible on the visible side of the seat cover.

The object of the present invention is therefore to create a process that permits seat covers having integrated fasteners to be manufactured quickly and in which the fasteners exhibit a high degree of stability, can be manufactured in any desired shape and with any desired stability, and are less visible from the visible side of the knitted fabric than is the case in prior-art processes. It is also the object of the invention to create a seat cover having integrated fasteners that are not visible from the visible side and that permit the seat cover to be optimally fit onto the seat cover support.

SUMMARY OF THE INVENTION

In the invention, fasteners are integrated into the knitted seat cover while the cover is being manufactured. However, these fasteners are not knitted together with the cover. Instead, they are added as separate parts during manufacturing, and are then knitted into the seat cover. The feeding-in of these parts can be accomplished by means of carriers from which the fasteners are transferred to the needle bed. To accomplish this, the carriers must have areas on which the loops of the premanufactured fasteners are hung. These sections must have spacings corresponding to the gauge of a needle bed on the flat-bed knitting machine. This makes it easy to transfer the fasteners from the carrier onto the needle bed.

Another way to feed the fasteners to the knitted area on the flat-bed knitting machine is as yard goods. In this case, the fasteners can be of various lengths and sizes. The yard goods are then preferably rolled up and fed into the knitting area by means of a special feed system, for example by means of a thread guide with a thread feed mechanism. The thread guide preferably contains a cutting device to cut the yard goods at the desired position. The fasteners are then knitted into the knitted fabric in the manner of a weft thread.

In a further alternative, the fasteners can also be knitted at the same time as the seat cover on a different needle bed of a flat-bed knitting machine and then transferred to the desired position in the knitting area, or simply knitted together, an operation which can be accomplished in particular on four-bed machines. This also avoids increasing the machine run times while the fasteners are being knitted, since in this embodiment of the invention the seat cover and the fasteners are knitted simultaneously on separate needle beds.

Elastic threads or synthetic fibers having good elastic properties can be knitted into the aforesaid fasteners, which may generally be configured as punctiform or linear fasteners, in order to fix the position of the seat cover elastically on the support by means of the fasteners. When various elastic threads are used in this way, the elasticity and recovery properties of the system used to mount the fasteners can be defined precisely. As a general rule, elastic threads or groups of elastic threads that are floated over several needles, or elastic threads or groups of elastic threads that are inserted as loops, warp and/or weft threads can be utilized to make the attachment to a hook that would be embodied in the seat cover support. The fasteners can also be embodied as elastic borders, elastic tapes, elastic loops or elastic tunnels, depending on which fastening method is desired.

The connection between the fasteners that are added and the main knitted fabric of the seat cover may also be produced by thermal means as well as by knitting. For example, the fasteners may be composed of tapes or welts that can have fasteners such as eyes or hooks. The fasteners can also be in the form of tubes that are made thicker using wires or cords to form an elongated thicker area that can be hooked or clipped into receiving areas. A thicker area of this type can be hardened and stabilized by means of a thermal treatment. A thicker area of this type can preferably be knitted directly onto the underside of a tubular cover so that it can be pulled onto a frame. This thicker area is then grasped by complementary fasteners and can be used to connect the ends of the cover or to secure the cover on a frame.

As an alternative to the processes described above, the fastener can also be integrated into the seat cover. In this case, in a first alternative, adhesive threads having a low melting point, for example Grilon® manufactured by Ems Chemie, can either be knitted together as the main knitted fabric and/or they can be inserted or plaited on as warp or weft threads. The adhesive thread is preferably incorporated in the main knitted fabric in such floated loops, in other words in a very widely spaced loop structure, or it is incorporated into the main knitted fabric in the form of loops similar to terry-cloth loops. Next, the cover is pulled onto the three-dimensional support part. The cover is then bonded onto the cushion support, for example by means of simple steam heating, at the points at which the adhesive thread touches the knitted fabric as well as the support. In the case of warp or weft threads or floated structures, for example, these points can be linear areas or points that provide optimal contact of the cover to the support in a contoured area as a consequence of their carefully selected distribution. This method can be used in particular with foam cushion supports and, as an alternative to or in addition to the aforesaid linear or punctiform fasteners, it can be integrated in the form of loops, welts or tapes knitted onto the seat cover. In addition to the inclusion of adhesive threads, thermal shrink threads can be applied at highly contoured areas, which then contract somewhat with thermal treatment, causing the upholstery cover to lie taut on the seat cushion or seat support. Combining the adhesive thread with the thermal shrink thread, which can be incorporated into the main knitted fabric in the same way as the adhesive thread, achieves an optimal connection between the seat cover and the seat cover support across the surface of the cover and ensures that the cover fits optimally on the support. There are two reasons for this: first, upon thermal treatment the upholstery cover shrinks down snugly onto the upholstery support, and second, the adhesive threads are activated at the same time as the aforesaid shrinking occurs, thus creating a good connection between the seat cover and the seat cover support. This produces seats that have strong visual appeal and a uniform look, and whose fasteners are not visible from the outside. Using adhesive or hot-melt threads to make the attachments means that the cover can be joined directly to the support following the thermal treatment and that no barrier films are needed between the cover and the foam molded onto the support. As a result, seating is comfortable and well ventilated.

As an alternative to or in addition to the attachment technology in which adhesive threads are used to achieve bonding over large surface areas, hook-and-loop tapes or hook-and-loop surfaces can be provided on the side of the seat cover facing the seat cover support. In this case, for example, the looped tapes having the loops can be embodied in the cover by knitting the loops right into the material. However, the hooks of the hook-and-loop fastening structure can also be embodied in the form of loops if said loops are knitted into the support side of the seat cover using a relatively hard, thick monofilament and are then cut open at a defined angle, for example using a blade integrated with the needles on the flat-bed knitting machine. In this way, at least one hook is formed from a loop. This loop can interact with the complementary looped side of the hook-and-loop fastening structure. Thus, both sides of the hook-and-loop connection can be integrated into the seat cover without the need for additional process steps and without significantly increasing the length of time that the machines need to run to produce the seat cover. The loops can also be stabilized in the cover by means of adhesive threads or hot-melt threads.

As an alternative to or in addition to the incorporation of thermal shrink threads as already described above, elastic threads can of course also be integrated into the basic structure of the knitted fabric, so that the seat cover contacts the seat cover support in an elastic manner.

BRIEF DESCRIPTION OF THE DRAWINGS

The invention shall now be described by way of example based on the schematic drawing. In this drawing.

DETAILED DESCRIPTION

Figure 1:
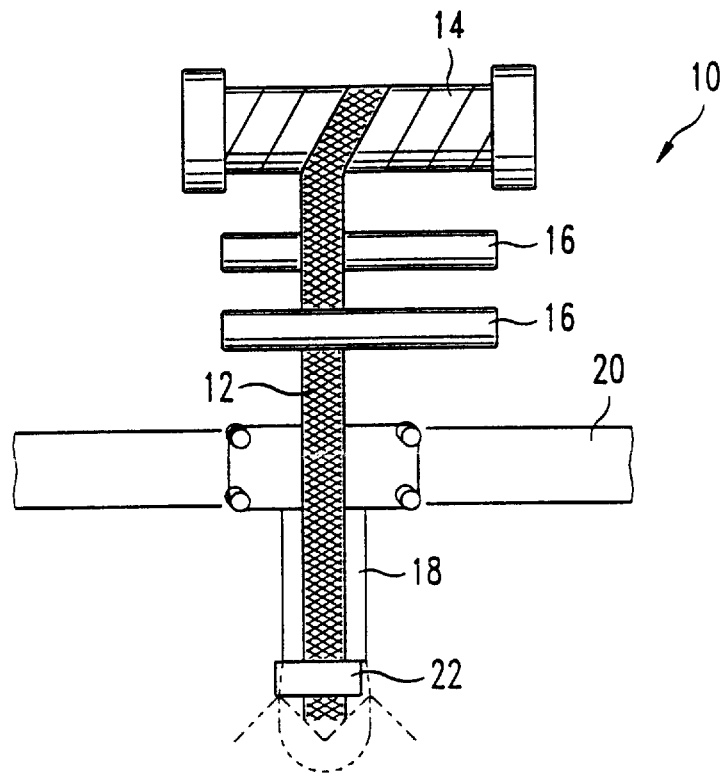
FIG. 1 shows a feed mechanism for fasteners supplied in the form of yard goods.

FIG. 1 shows a device 10 for feeding in fasteners in the form of yard goods rolled onto a feed roller 14. The yard goods 12 are fed to a thread guide 18 by two feeder rolls 16. The thread guide 18 is held on a thread guide rail 20 in such a way that it is able to move along the rail. The thread guide 18 has a cutting blade 22 on its lower end. The cutting blade 22 is used to cut off the fastener at the desired position. The fastener can be knitted together at the beginning and end, or at one of the lateral edges, with the main knitted fabric and/or also attached to the main knitted fabric of the seat cover by means of a thermal treatment, for example thermal fusion or adhesive bonding.

Figure 2:
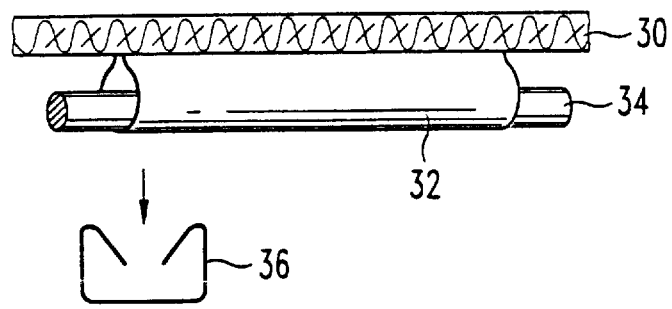
FIG. 2 shows a first type of fasteners in the form of filled tubes.

FIG. 2 shows a cross-sectional view of a two-layer main knitted fabric 30 into which a separately made tube 32 is knitted in. Passing through the tube 32 is a wire, a cord, or a relatively thick monofilament. Thus, either the monofilament 34 itself or the welt-shaped embodiment of the tube 32 after the monofilament 34 has been passed through it can be used as a fastener. This fastener is then preferably secured in a U-shaped profile 36 that, for example, can be foamed in place in the seat cover support or can be attached in some other manner.

Figure 3:
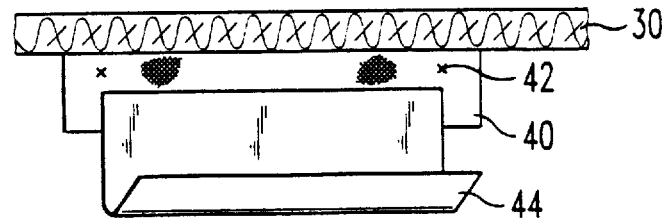
FIG. 3 shows its second type of fasteners.
Figure 4:
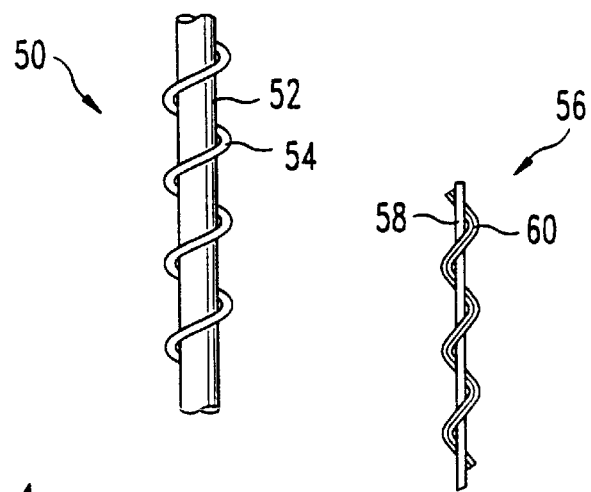
FIG. 4 shows two different types of hot-melt thread placement.

FIG. 3 also shows a two-layer main knitted fabric 30 onto which a separately made tab 40 is integrally knitted, fused on in a thermal process, or adhesively bonded. The tab 40 contains markings 42 that indicate the locations at which a separate fastening profile 44 of metal or plastic is to be adhesively bonded, fused or in some other way attached to the tab. Sewing, tacking, stapling or other similar connecting techniques are suitable as additional fastening methods. FIG. 4 shows two different embodiments of adhesive threads that can be knitted into the main knitted fabric 30 or can be inserted into the main knitted fabric 30 as warp and/or weft threads in order to produce planar attachment areas. The first adhesive thread 50 comprises a base thread 52 around which an adhesive filament 54 is wound. The filament melts and bonds upon thermal treatment. In the second adhesive thread 56 the core is comprised of an adhesive filament 58 around which a multi-filament yarn 60 is wound. This second adhesive thread has greater elasticity and is intended to be incorporated in particular in the main knitted fabric of the seat cover in areas subject to elastic deformation. This can be accomplished either by knitting it directly into the knitted fabric or by inserting it as a warp and/or weft and/or pile thread.

Figure 5:
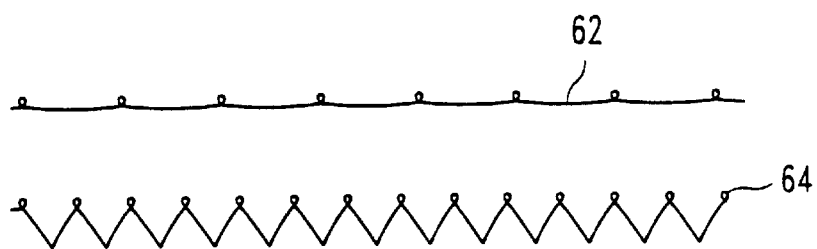
FIG. 5 shows two different types of bonding to produce a looped tape and a hooked tape in a hook-and-loop connection.
Figure 6:
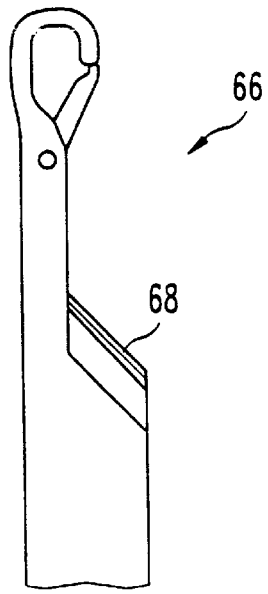
FIG. 6 shows a needle of a flat-bed knitting machine having an integrated blade to cut open the loops on the hooked tape.

FIG. 5 shows two structures that can be used to form the two components of a hood-and-loop fastening structure. The first thread, marked 62, is provided to form the looped areas of the hook-and-loop fastening structure. This first thread 62 is knitted at relatively large intervals, between which it is floated. The second thread 64 is alternately knitted and tucked at short intervals to form relatively hard, stable loops. It is preferably comprised of a thick, relatively hard monofilament. After this monofilament is incorporated into the main knitted fabric, it is cut by a special needle 66 (FIG. 6) to form a hook. The special needle 66 is equipped with a cutting edge 68 for this purpose. When the needle 66 is fully extended, the resulting loop in the monofilament 64 is cut open to form a hook, which interacts with the looped area of the thread 62 in the manner of a hook-and-loop fastening structure. Both the looped area and the hooked area of the hook-and-loop fastening structure can be present in the seat cover. Integrally knitting the respective threads, 62, 64, into the main knitted fabric 30 does not require any additional effort, and machine operating times are not lengthened substantially. The complementary structures are present in the seat cover support.

Figure 7:
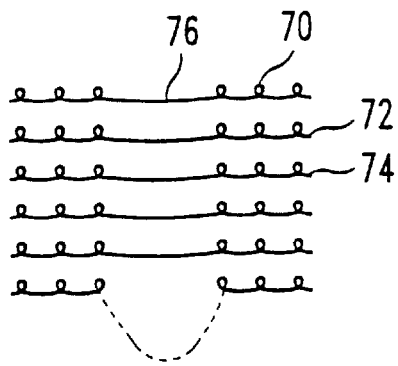
FIG. 7 shows a knitting pattern to produce a bundle of filaments for securing on a hook.

FIG. 7 shows an additional way in which a fastener may be made. In it, various wales, 70, 72, 74, are left unknitted in a specified area 76, i.e. they are floated. Outside this area, the threads of the various wales, 70, 72, 74, are knitted in the normal manner. The floated area creates a multi-filament area that can be used to engage a hook, welt, or similar element.

Figure 8:
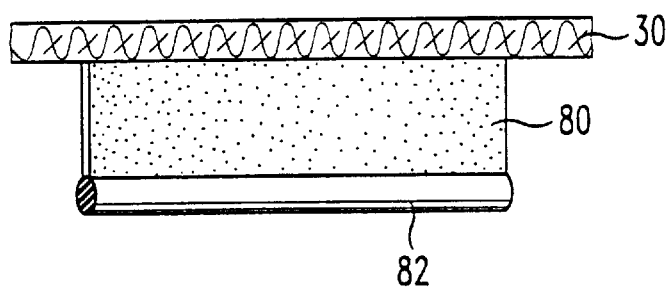
FIG. 8 shows an additional fastener with an integrated rubber tensioner, FIGS. 9a,b show different types of fasteners.

FIG. 8 shows the main knitted fabric 30 into which an elastic tab 80 is integrally knitted. The other end of said elastic tab 80 has a welt 82. The elastic tab forms the elastic connection between the fastener per se, the welt 82, and the main knitted fabric 30. This allows the seat cover to be preloaded against the seat cover support after the welt 82 has been fastened in a complementary fastener on the seat cover support, which in turn ensures that the seat cover is perfectly seated on the support.

Figure 9:
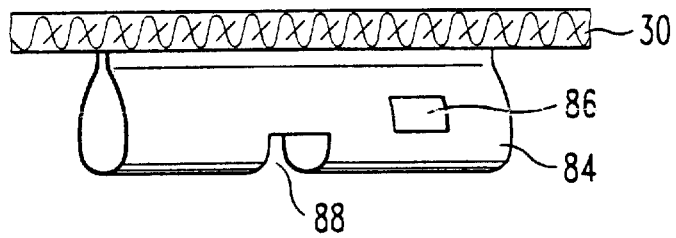
Figure 9:
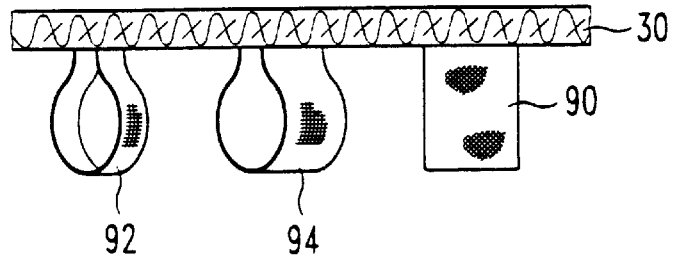

FIG. 9 shows in alternative a) how a tubular knitted-on fastener 84 can be provided with windows 86 or openings 88 in order to form individually fitted fastening areas for securing the cover to a seat cover support. In alternative b) the fastener is either integrally knitted in or adhesively bonded or fused onto the main knitted fabric 30, either as a tab 90, a narrow loop 92, or a wide loop 94.

What is claimed is:

1. A process for providing a knitted seat cover with a first portion of a fastening structure having first and second complementary portions, for fastening the seat cover to a seat cover support provided with the second portion of the fastening structure, wherein the fastening structure is a hook-and-loop fastening structure and said first portion of the hook-and-loop fastening structure is a loop portion and said second portion of the hook-and-loop fastening structure is a hook portion, said process comprising:

knitting the seat cover by means of a flat-bed knitting machine and, during knitting of the seat cover, integrally knitting said loop portion of the hook-and-loop fastening structure on a side of the seat cover facing the seat cover support for interacting with said hook portion.

2. The process of claim 1, wherein semi-elastic threads having an elastic elongation capability >5% are incorporated into the knitted fabric.

3. A process for providing a knitted seat cover with a first portion of a first fastening structure and a second portion of a second fastening structure, each fastening structure having first and second complementary portions, for attaching the seat cover to a seat cover support provided with the second portion of the first fastening structure and the first portion of the second fastening structure, wherein each fastening structure is a hook-and-loop fastening structure and said first portion of each hook-and-loop fastening structure is a loop portion and said second portion of each hook-and-loop fastening structure is a hook portion, said process comprising:

knitting the seat cover by means of a flat-bed knitting machine and, during knitting of the seat cover, integrally knitting said loop portion of the first fastening structure on a side of the seat cover facing the seat cover support for interacting with said hook portion of the first fastening structure, and providing said hook portion of the second fastening portion on said side of the seat cover by knitting in a hard or hardenable monofilament in loops projecting out toward the support and cutting the loops open.

4. The process of claim 3, including casting the loops of monofilament off from the needles of the flat-bed knitting machine and cutting the loops during the casting off.

5. The process of claim 3, including casting the loops of monofilament off from the needles of the flat-bed knitting machine and cutting the loops after the casting off.

6. The process of claim 3, comprising cutting the loops of monofilament at a predetermined angle.

7. A process for providing a knitted seat cover with a first portion of a fastening structure having first and second complementary portions, for fastening the seat cover to a seat cover support provided with the second portion of the fastening structure, wherein the fastening structure is a hook-and-loop fastening structure and said first portion of the hook-and-loop fastening structure is a hook portion and said second portion of the hook-and-loop fastening structure is a loop portion, said process comprising:

knitting the seat cover by means of a flat-bed knitting machine and, during knitting of the seat cover, providing the hook portion of the fastening structure by knitting in a hard or hardenable monofilament in loops projecting out toward the support and cutting the loops open.

8. The process of claim 7, including casting the loops of monofilament off from the needles of the flat-bed knitting machine and cutting the loops during the casting off.

9. The process of claim 7, including casting the loops of monofilament off from the needles of the flat-bed knitting machine and cutting the loops after the casting off.

10. The process of claim 7, comprising cutting the loops of monofilament at a predetermined angle.

11. A knitted seat cover for fastening to a seat cover support provided with a first portion of a fastener including first and second complementary portions, wherein the second portion of the fastener is provided on a side of the seat cover facing the seat cover support and is formed by integrated adhesive threads whose adhesive characteristics are activated at elevated temperatures.

12. The seat cover of claim 11, wherein the second portion of the fastener includes thermal shrink threads knitted in or incorporated into the seat cover.

13. The seat cover of claim 12, wherein the shrink threads are incorporated into the knitted fabric as warp threads.

14. The seat cover of claim 12, wherein the shrink threads are incorporated into the knitted fabric as weft threads.

15. The seat cover of claim 12, wherein the seat cover has an outer side facing away from the seat cover support and the shrink threads are disposed in three-dimensionally contoured areas in which the outer side of the cover is convexly curved.

16. The seat cover of claim 11, wherein the adhesive threads are incorporated into the knitted fabric as warp threads.

17. The seat cover of claim 11, wherein the adhesive threads are incorporated into the knitted fabric as weft threads.

18. The seat cover of claim 11, wherein the seat cover has an outer side facing away from the seat cover support and the adhesive threads are disposed in three-dimensionally contoured areas in which the outer side of the cover is convexly curved.

19. The seat cover of claim 11, comprising elastic or semi-elastic threads having a reversible elongation capability >5% incorporated into the knitted fabric.

20. A seat including a seat cover support and a seat cover and a fastener having first and second complementary portions, wherein the seat cover support is provided with said first portion of the fastener and the seat cover is provided with said second portion of the fastener on a side facing the seat cover support, for fastening the seat cover to the seat cover support, and the second portion of the fastener is formed of integrated adhesive threads whose adhesive characteristics are activated at elevated temperatures.

21. A process for manufacturing a seat cover, comprising:
    knitting the seat cover on a flat-bed knitting machine including a cutting device,
    supplying a fastener in the form of premanufactured yard goods to a knitting area of the flat-bed knitting machine,
    cutting off the supplied fastener at a desired length by means of the cutting device, and
    knitting the supplied fastener into the seat cover, thereby integrating the fastener into the seat cover at selected locations.

22. The process of claim 21, wherein the selected locations are linear or are discrete points.

23. The process of claim 21, comprising guiding the yard goods into the knitting area by means of a thread guide having its own feed device.

24. The process of claim 21, wherein semi-elastic threads having an elastic elongation capability >5% are incorporated into the knitted fabric.

25. A process for manufacturing a seat including a seat cover support and a seat cover, comprising:
    manufacturing a seat cover by a process according to claim 21,
    providing the seat cover support with a fastener that is complementary to the fastener of the seat cover, and
    employing the fastener to secure the seat cover to the seat cover support.

26. A process for manufacturing a seat cover, comprising:
    knitting the seat cover on a flat-bed knitting machine having a needle bed,
    supplying a premanufactured fastener element to a knitting area of the flat-bed knitting machine by means of a carrier, the premanufactured fastener element including loops,
    hanging the loops of the premanufactured fastener element on areas of the carrier that are spaced such that the distance between the loops corresponds to the needle gauge of the needle bed, and
    knitting the premanufactured fastener element into the seat cover, whereby the premanufactured fastener element is integrated into the seat cover.

27. The process of claim 26, wherein semi-elastic threads having an elastic elongation capability >5% are incorporated into the knitted fabric.

28. A process for manufacturing a seat including a seat cover support and a seat cover, comprising:
    manufacturing a seat cover by a process according to claims 26,
    providing the seat cover support with a fastener element that is complementary to the fastener element of the seat cover, and
    employing the fastener elements to secure the seat cover to the seat cover support.

29. A process for manufacturing a seat cover, comprising:
    knitting the seat cover on first area of a flat-bed knitting machine,
    concurrently knitting a fastener portion on a second area of the flat-bed knitting machine,
    transferring loops of the fastener portion to the first area of the flat-bed knitting machine, and
    knitting the fastener portion at least partially together with the seat cover, whereby the fastener portion is integrated into the seat cover.

30. The process of claim 29, wherein the fastener is embodied as a thicker area or filled tube to which additional fasteners are attached.

31. The process of claim 29, wherein semi-elastic threads having an elastic elongation capability >5% are incorporated into the knitted fabric.

32. A process for manufacturing a seat including a seat cover support and a seat cover, comprising:
    manufacturing a seat cover by a process according to claim 29,
    providing the seat cover support with a fastener portion that is complementary to the fastener portion of the seat cover, and
    employing the fastener portions to secure the seat cover to the seat cover support.

* * * * *